US011989936B2

(12) United States Patent
Chellappan et al.

(10) Patent No.: US 11,989,936 B2
(45) Date of Patent: *May 21, 2024

(54) LEVERAGING SMART-PHONE CAMERAS AND IMAGE PROCESSING TECHNIQUES TO CLASSIFY MOSQUITO GENUS AND SPECIES

(71) Applicant: University of South Florida, Tampa, FL (US)

(72) Inventors: Sriram Chellappan, Tampa, FL (US); Pratool Bharti, Tampa, FL (US); Mona Minakshi, Tampa, FL (US); Willie McClinton, Tampa, FL (US); Jamshidbek Mirzakhalov, Tampa, FL (US)

(73) Assignee: University of South Florida, Tampa, FL (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/901,494

(22) Filed: Sep. 1, 2022

(65) Prior Publication Data
US 2023/0004756 A1 Jan. 5, 2023

Related U.S. Application Data

(63) Continuation of application No. 17/168,941, filed on Feb. 5, 2021, now Pat. No. 11,501,113, which is a
(Continued)

(51) Int. Cl.
*G06V 20/00* (2022.01)
*G06F 18/211* (2023.01)
(Continued)

(52) U.S. Cl.
CPC ............ *G06V 20/00* (2022.01); *G06F 18/211* (2023.01); *G06F 18/2155* (2023.01);
(Continued)

(58) Field of Classification Search
CPC .............................. G06V 10/56; G06V 10/44
See application file for complete search history.

(56) References Cited

U.S. PATENT DOCUMENTS

| 6,026,174 A * | 2/2000 | Palcic | G01N 33/5017 |
| | | | 382/128 |
| 7,149,356 B2 * | 12/2006 | Clark | G06V 10/255 |
| | | | 382/199 |

(Continued)

FOREIGN PATENT DOCUMENTS

| CN | 106599925 | 4/2017 |
| CN | 107463958 | 12/2017 |

(Continued)

OTHER PUBLICATIONS

De Los Reyes, Anna Monica M., et al. "Detection of Aedes Aegypti mosquito by digital image processing techniques and support vector machine." 2016 IEEE Region 10 Conference (Tencon). IEEE, 2016. pp. 2342-2345. Singapore.

(Continued)

*Primary Examiner* — Kevin Ky
(74) *Attorney, Agent, or Firm* — Meunier Carlin & Curfman LLC

(57) ABSTRACT

Identifying insect species integrates image processing, feature selection, unsupervised clustering, and a support vector machine (SVM) learning algorithm for classification. Results with a total of 101 mosquito specimens spread across nine different vector carrying species demonstrate high accuracy in species identification. When implemented as a smart-phone application, the latency and energy consumption were minimal. The currently manual process of species identification and recording can be sped up, while also minimizing the ensuing cognitive workload of personnel. Citizens at large can use the system in their own homes
(Continued)

for self-awareness and share insect identification data with public health agencies.

20 Claims, 8 Drawing Sheets

Related U.S. Application Data continuation of application No. 16/673,641, filed on Nov. 4, 2019, now Pat. No. 10,963,742.

(60) Provisional application No. 62/754,971, filed on Nov. 2, 2018.

(51) Int. Cl.
| | |
|---|---|
| *G06F 18/214* | (2023.01) |
| *G06F 18/23* | (2023.01) |
| *G06V 10/22* | (2022.01) |
| *G06V 10/44* | (2022.01) |
| *G06V 10/56* | (2022.01) |
| *G06V 10/764* | (2022.01) |
| *G06V 20/30* | (2022.01) |
| *G06F 18/2411* | (2023.01) |

(52) U.S. Cl.
CPC .............. *G06F 18/23* (2023.01); *G06V 10/22* (2022.01); *G06V 10/44* (2022.01); *G06V 10/56* (2022.01); *G06V 10/764* (2022.01); *G06V 20/30* (2022.01); *G06F 18/2411* (2023.01)

(56) References Cited

U.S. PATENT DOCUMENTS

| | | | | |
|---|---|---|---|---|
| 7,496,228 | B2 | 2/2009 | Landwehr et al. | |
| 8,606,011 | B1* | 12/2013 | Ivanchenko | G06V 30/1478 382/199 |
| 9,092,691 | B1* | 7/2015 | Beaumont | G06V 10/25 |
| 9,445,108 | B1* | 9/2016 | Ahmed | H04N 19/23 |
| 11,501,113 | B2* | 11/2022 | Chellappan | G06F 18/2155 |
| 2003/0026484 | A1* | 2/2003 | O'Neill | G06F 18/28 382/224 |
| 2009/0301198 | A1* | 12/2009 | Sohn | G01N 29/262 73/598 |
| 2010/0284626 | A1* | 11/2010 | Malm | G06T 5/70 382/260 |
| 2011/0242285 | A1* | 10/2011 | Byren | G06V 10/10 348/47 |
| 2012/0306904 | A1* | 12/2012 | Francois | A63F 13/52 345/589 |
| 2015/0193941 | A1* | 7/2015 | Wang | G06T 7/13 382/199 |
| 2015/0254850 | A1* | 9/2015 | Jorgensen | A61B 5/489 382/133 |
| 2015/0310268 | A1* | 10/2015 | He | G06F 18/22 382/135 |
| 2017/0234837 | A1* | 8/2017 | Hall | B06B 3/00 73/602 |
| 2019/0020871 | A1* | 1/2019 | Xu | H04N 19/197 |
| 2019/0034736 | A1* | 1/2019 | Bisberg | A01G 7/00 |
| 2019/0121782 | A1* | 4/2019 | Sun | H04W 84/04 |
| 2019/0370965 | A1* | 12/2019 | Lay | G06N 20/00 |
| 2020/0072730 | A1* | 3/2020 | Wong | G06V 20/695 |
| 2020/0329233 | A1* | 10/2020 | Nemirofsky | H04N 19/136 |
| 2023/0004756 | A1* | 1/2023 | Chellappan | G06F 18/2155 |

FOREIGN PATENT DOCUMENTS

| | | |
|---|---|---|
| CN | 104850836 | 4/2018 |
| CN | 108304818 | 7/2018 |
| CN | 108334938 | 7/2018 |

OTHER PUBLICATIONS

2018. CDC—Malaria—About Malaria—Biology—Mosquitoes—Anopheles Mosquitoes. https://www.cdc.gov/malaria/about/biology/mosquitoes/. (Accessed on Mar. 2, 2018).
2018. Explanation of the LAB Color Space. https://www.aces.edu/dept/fisheries/education/pondtoplate/documents/ExplanationoftheLABColorSpace.pdf: (Accessed on Feb. 24, 2018). (Abstract Only).
2018. Image Derivative • Chris McCormick. http://mccormickml.com/2013/02/26/image-derivative/. (Accessed on Mar. 1, 2018).
2018. Project Premonition—Microsoft Research. https://www.microsoft.com/en-us/research/project/project-premonition/. (Accessed on Feb. 23, 2018).
Ahmedelmubarak Bashir, Zeinab A Mustafa, Islah Abdelhameid, and Rimaz Ibrahem. 2017. Detection of malaria parasites using digital image processing. In Communication, Control, Computing and Electronics Engineering (ICCCCEE), 2017 International Conference on. IEEE, 1-5.
D Baswaraj, A Govardhan, and P Premchand. 2012. Active contours and image segmentation: The current state of the art. Global Journal of Computer Science and Technology (2012).
Sean Borman. 2004. The expectation maximization algorithm—a short tutorial. Submitted for publication (2004), 1-9.
Yanping Chen, Adena Why, Gustavo Batista, Agenor Mafra-Neto, and Eamonn Keogh. 2014. Flying insect detection and classification with inexpensive sensors. Journal of visualized experiments: JoVE 92 (2014), 52111.
Corinna Cortes and Vladimir Vapnik. 1995. Support-vector networks. Machine learning 20, 3 (1995), 273-297.
Jia Deng, Wei Dong, Richard Socher, Li-Jia Li, Kai Li, and Li Fei-Fei. 2009. Imagenet: A large-scale hierarchical image database. In Computer Vision and Pattern Recognition, 2009. CVPR 2009. IEEE Conference on. IEEE, 248-255.
Anita Dixit and Nagaratna P Hegde. 2013. Image texture analysis-survey. In Advanced Computing and Communication Technologies (ACCT), 2013 Third International Conference on. IEEE, 69-76.
Colin Favret and Jeffrey M Sieracki. 2016. Machine vision automated species identification scaled towards production levels. Systematic Entomology 41, 1 (2016), 133-143.
Masataka Fuchida, Thejus Pathmakumar, Rajesh Elara Mohan, Ning Tan, and Akio Nakamura. 2017. Vision-based perception and classification of mosquitoes using support vector machine. Applied Sciences 7, 1 (2017), 51.
Robert M Haralick, Karthikeyan Shanmugam, et al. 1973. Textural features for image classification. IEEE Transactions on systems, man, and cybernetics 6 (1973), 610-621.
PS Hiremath and Rohini A Bhusnurmath. 2013. Texture Image Classification Using Nonsubsampled Contourlet Transform and Local Directional Binary Patterns. International Journal 3, 7 (2013).
T Huang, GJTGY Yang, and G Tang. 1979. A fast two-dimensional median filtering algorithm. IEEE Transactions on Acoustics, Speech, and Signal Processing 27, 1 (1979), 13-18.
PG Jupp. 1996. Mosquitoes of Southern Africa: Culicinae and Toxorhynchitinae. Hartebeespoort.
Maxime Martineau, Donatello Conte, Romain Raveaux, Ingrid Arnault, Damien Munier, and Gilles Venturini. 2017. A survey on image-based insect classification. Pattern Recognition 65 (2017), 273-284.
Conor J McMeniman, Román A Corfas, Benjamin J Matthews, Scott A Ritchie, and Leslie B Vosshall. 2014. Multimodal integration of carbon dioxide and other sensory cues drives mosquito attraction to humans. Cell 156, 5 (2014), 1060-1071.
Sebastian Mika, Gunnar Ratsch, Jason Weston, Bernhard Scholkopf, and Klaus-Robert Mullers. 1999. Fisher discriminant analysis with kernels. In Neural Networks for Signal Processing IX, 1999. Proceedings of the 1999 IEEE Signal Processing Society Workshop. IEEE, 41-48.
Mona Minakshi, Pratool Bharti, and Sriram Chellappan. 2017. Identifying mosquito species using smart-phone cameras. In Networks and Communications (EuCNC), 2017 European Conference on. IEEE, 1-6.

(56) References Cited

OTHER PUBLICATIONS

Haripriya Mukundarajan, Felix JH Hol, Erica A Castillo, Cooper Newby, and Manu Prakash. 2016. Using Mobile Phones as Acoustic Sensors for the Surveillance of Spatio-temporal Mosquito Ecology. (2016).

Munoz, R. Boger, S. Dexter, R. Low, and J. Li. 2018. Image Recognition of Disease-Carrying Insects: A System for Combating Infectious Diseases Using Image Classification Techniques and Citizen Science. (2018).

Luis Perez and Jason Wang. 2017. The effectiveness of data augmentation in image classification using deep learning. arXiv preprint arXiv:1712.04621 (2017).

Antonio Rodríguez García, Frederic Bartumeus, and Ricard Gavaldà Mestre. 2016. Machine learning assists the classification of reports by citizens on diseasecarrying mosquitoes. In SoGood 2016: Data Science for Social Good: Proceedings of the First Workshop on Data Science for Social Good co-located with European Conference on Machine Learning and Principles and Practice of Knowledge Dicovery in Databases (ECML-PKDD 2016): Riva del Garda, Italy, Sep. 19, 2016. CEURWS. org, 1-11.

Michael W Schwarz, William B Cowan, and John C Beatty. 1987. An experimental comparison of RGB, YIQ, LAB, HSV, and opponent color models. ACM Transactions on Graphics (TOG) 6, 2 (1987), 123-158.

Karen Simonyan and AndrewZisserman. 2014. Very deep convolutional networks for large-scale image recognition. arXiv preprint arXiv:1409.1556 (2014).

Irwin Sobel. 2014. An Isotropic 3x3 Image Gradient Operator. (Feb. 2014).

Chris Stauffer andWEric L Grimson. 1999. Adaptive background mixture models for real-time tracking. In Computer Vision and Pattern Recognition. 1999. IEEE Computer Society Conference on., vol. 2. IEEE, 246-252.

Brandyn White and Mubarak Shah. 2007. Automatically tuning background subtraction parameters using particle swarm optimization. In Multimedia and Expo, 2007 IEEE International Conference on. IEEE, 1826-1829.

André Barretto Bruno Wilke, Rafael de Oliveira Christe, Laura Cristina Multini, Paloma Oliveira Vidal, Ramon Wilk-da Silva, Gabriela Cristina de Carvalho, and Mauro Toledo Marrelli. 2016. Morphometric wing characters as a tool for mosquito identification. PloS one 11, 8 (2016), e0161643.

Mona Minakshi, Pratool Bharti, Sriram Chellappan. 2018. Leveraging Smart-Phone Cameras and Image Processing Techniques to Classify Mosquito Species. MobiQuitous '18 Proceedings of the 15th EAI International Conference on Mobile and Ubiquitous Systems: Computing, Networking and Services, pp. 77-86, Nov. 5-7, 2018.

\* cited by examiner

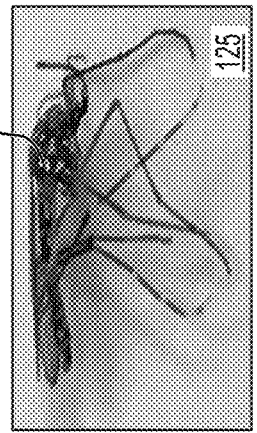 FIG. 1A AEDES AEGYPTI
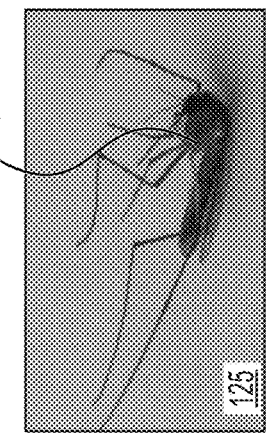 FIG. 1B AEDES INFIRMATUS
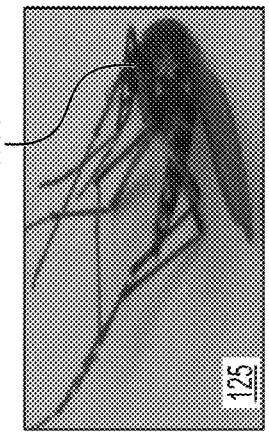 FIG. 1C AEDES TAENIORHYNCHUS
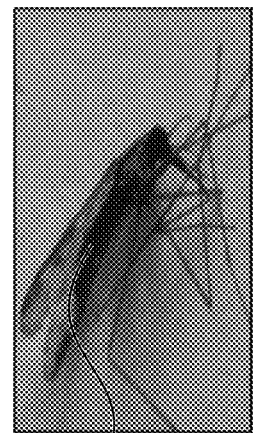 FIG. 1D ANOPHELES CRUCIANS
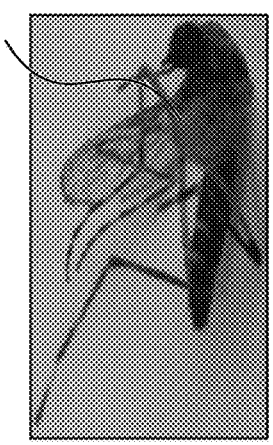 FIG. 1E COQUILLETTIDIA PERTURBANS
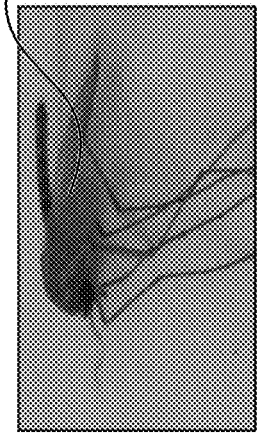 FIG. 1F CULEX NIGRIPALPUS
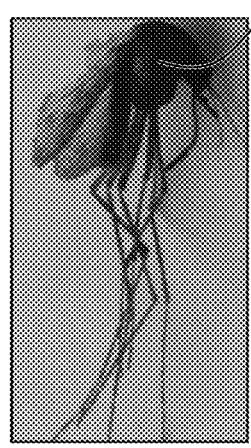 FIG. 1G MANSONIA TITILLANS
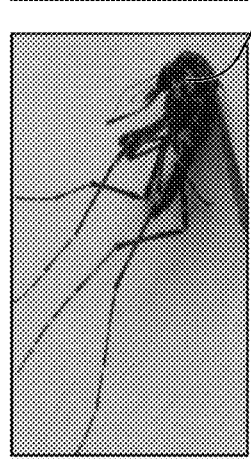 FIG. 1H PSOROPHORA COLUMBIAE
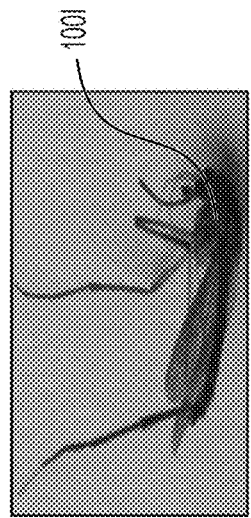 FIG. 1I PSOROPHORA FEROX

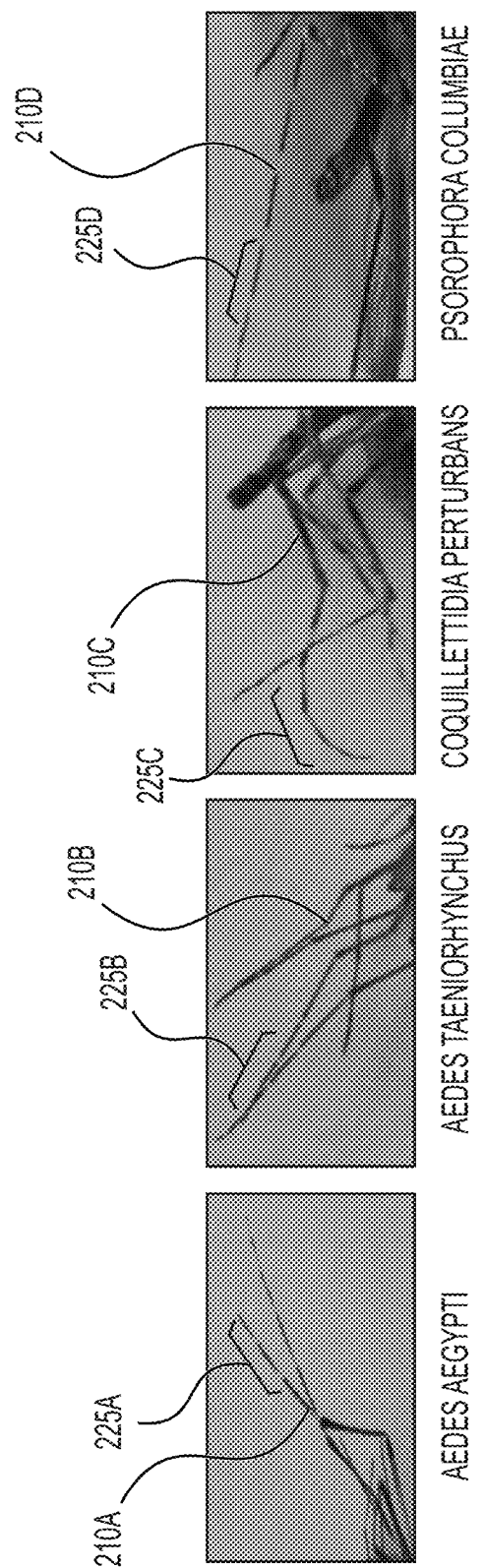

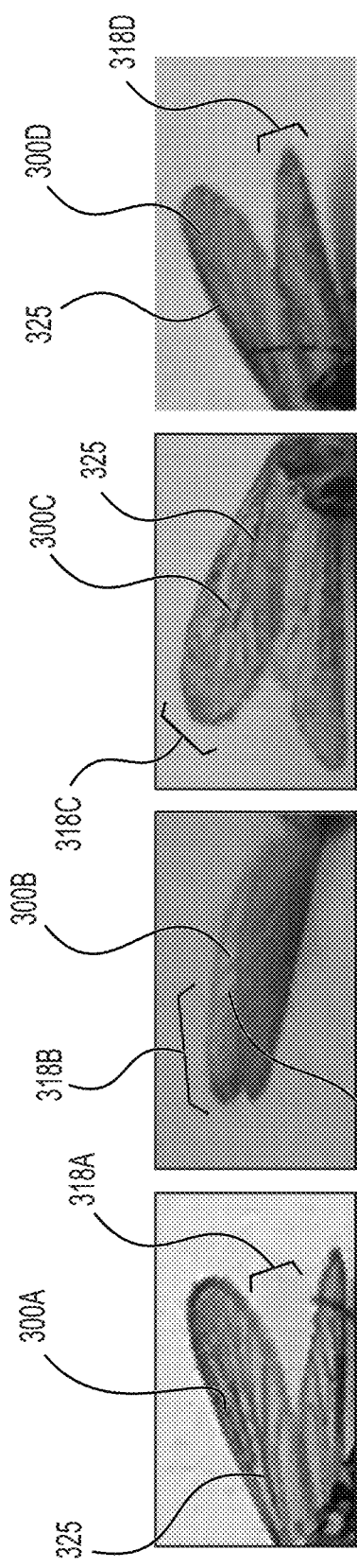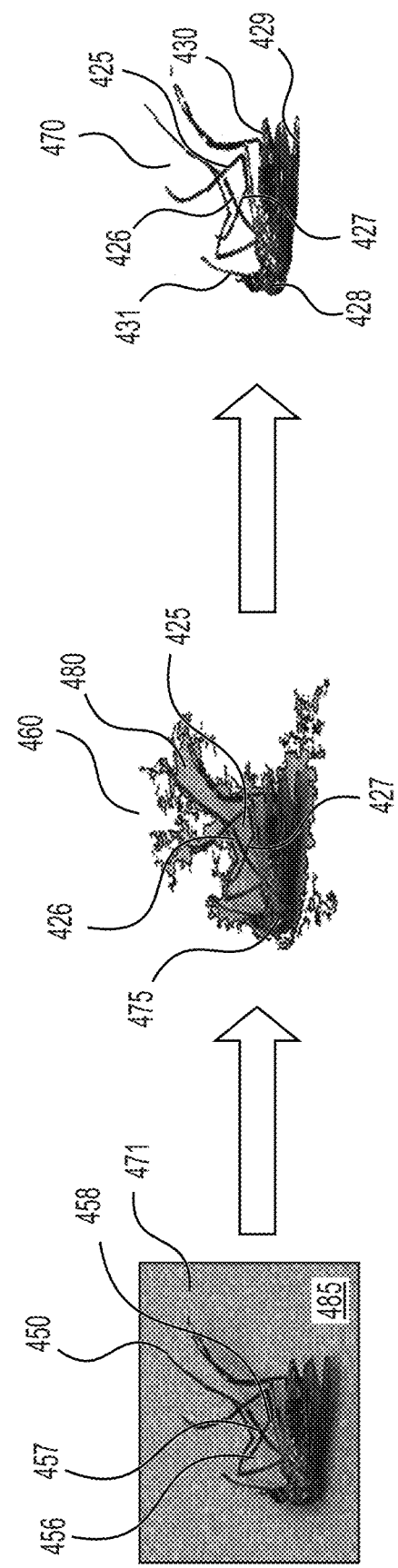

LEVERAGING SMART-PHONE CAMERAS AND IMAGE PROCESSING TECHNIQUES TO CLASSIFY MOSQUITO GENUS AND SPECIES

CROSS REFERENCE TO RELATED APPLICATIONS

This application claims priority to and incorporates entirely by reference U.S. patent application Ser. No. 17/168,941 filed on Feb. 5, 2021, which is a continuation of U.S. patent application Ser. No. 16/673,641, filed on Nov. 4, 2019, now U.S. Pat. No. 10,963,742, which claims priority to Provisional Patent Application Ser. No. 62/754,971 filed on Nov. 2, 2018, all entitled Leveraging Smart-Phone Cameras and Image Processing Techniques to Classify Mosquito Genus and Species.

ACKNOWLEDGMENT OF GOVERNMENT SUPPORT

This invention was made with government support under grant CBET 1743985 awarded by the National Science Foundation. The government has certain rights in the invention.

BACKGROUND

Mosquito borne diseases (e.g., Malaria, Dengue, West Nile Fever, and most recently Zika Fever) are among the biggest health care concerns across the globe today. To mitigate the spread of mosquito borne diseases, it is vital to combat the spread of mosquitoes. Of critical importance in this mission is the identification of species prevalent in an area of interest. This is important because there are close to 4,000 different species of mosquitoes present in the world today, spread across 40 or so genera [1], and with increasing globalization and warming, the species are spreading to newer locations, with some of them acting as vectors for several diseases. In any given location, multiple species are usually found at the same time (some being vectors for disease and some not). However, the process of genus and species identification is not at all easy.

As of today, to derive populations of mosquitoes in any area, trained professionals lay traps, and pick them up soon after to sort trapped specimens. Sometimes, hundreds of mosquitoes can be trapped in a single day. Then, to identify each specimen trapped, it is placed under a microscope, and visually identified (to determine genus and species), which takes hours each day for all specimens. Depending on location and time of year, this process can repeat multiple times in a single week, and is cognitively demanding. Such kinds of mosquito control facilities are expensive to manage, and they are few even in advanced countries. In low economy countries, where mosquitoes pose a greater danger, such facilities are even more scarce. With rising temperatures and population migrations, mosquitoes are believed to be invading newer areas across the world, and detecting them early is a huge challenge today.

Experts at mosquito control facilities acknowledge that, depending on location and time of the year, they can receive hundreds of calls each day from concerned citizens about mosquitoes in their neighborhoods. Due to limited resources, knowledge of mosquito genus and species types can play a vital role in prioritizing schedules for trap placement and spraying repellents during peak times, since different mosquito species are vectors for different diseases.

In general, the deadliest mosquitoes belong to three genus types: *Aedes, Anopheles* and *Culex*. Within these genera, the species that are most deadly include *Aedes aegypti* and *Aedes albopictus* (dengue, chikungunya, yellow fever and Zika fever); *Anopheles stephensi, Anopheles funestus* and *Anopheles gambiae* (malaria); *Culex nigripalpus, Culex pipiens* and *Culex quinquefasciatus* (St. Louis encephalitis, West Nile fever, eastern equine encephalitis). But note that the ones above are the only ones that spread diseases. There are other species with these three genus types, and other there are ones in other genus also that spread diseases. Sadly, despite citizens willing to assist in the process of mosquito identification, there is no way to enable that now. One practice recommended by experts is to ask citizens to collect a few mosquitoes (after spraying insecticide on them), and store them in a transparent bag for the experts to identify them later. But this process is cumbersome, and the need for technology-based solutions to empower citizens in this effort has become clear [33].

Overview of Proposed Solutions in Background Literature a). Image Based Techniques Using Digital Cameras: In [10], a solution is proposed to detect *Aedes aegypti* species using images taken from a 500× optical zoom camera and utilizing a computerized support vector machine classification algorithm. Using a sample of 40 images, seven textural features, and a support vector machine classification algorithm, an accuracy of 92.5% was demonstrated in classifying *Aedes aegypti* species from others. This solution though is expensive, and addresses a binary classification problem only. Work in [14] and [13] discusses machine learning techniques to classify mosquitoes from insects like flies and bees using images taken from digital cameras. The problem addressed in these papers is too generic though. In a recent paper [32], the authors address a problem similar to ours, but sufficiently different. Specifically, twelve (12) adult mosquito specimens from three genera (*Aedes, Anopheles* and *Culex*) were collected, and the right wing of each specimen was photographed using a sophisticated digital camera coupled with a microscope. Then, using coordinates at intersections of wing veins as a feature, followed by a Neighbor Joining Tree classification method, the accuracy in genus identification (among three) was 90%. This technique again is expensive and requires expertise.

b). Using Techniques other than Imaging: In [8], the authors attempt to use optical (rather than acoustic) sensors to record the "sound" of insect flight from a small distance, and then design a Bayesian classifier to identify four species of mosquitoes (*Aedes aegypti, Culex* quinque *fasciatus, Culex stigmatosoma,* and *Culex tarsalis*), and achieve an accuracy of 96%. Similarly, the work in [23] also leverages smart-phone microphones to capture and process sound, or acoustics, data of mosquito flight, along with location and time of observation. The claim is that these features are unique to classify mosquito species. More innovative techniques like hydrogel-based low-cost microfluidic chips, baited with odorants to capture saliva droplets of mosquitoes are being designed by researchers in order to serve as a test for vector species and pathogens. All of these techniques require "live" and "mobile" mosquitoes, with sensing devices placed close to them. They are not suited for ubiquitous and in-home use by both scientists as well as common citizens.

c). Other Related Work: A survey on imaging techniques to classify insects is presented in [19]. However, mosquitoes are not classified there. In [26], the authors ask citizens to use smart-phones for imaging and reporting about mosquitoes they encounter, but species classification is not discussed. In [24], Munoz et. al. propose a deep learning framework to classify larvae of mosquitoes from larvae of other insects, with smart-phone images. In [5], intensity of red blood cells computed from thin blood smear images were used to identify the presence of malarial (*plasmodium*) parasites in blood samples. Microsoft's "Project Premonition" is an ambitious effort to use drones and DNA sequencing techniques to identify mosquito species in hot-spots [4]. These recent works highlight important, but orthogonal tech-based solutions to combat mosquito-borne diseases, but ubiquitous and easy to use solutions for identifying mosquitoes species are not yet there.

To summarize, tech-based solutions to combat the spread of mosquito-borne diseases is an important need of the hour. However, there is no system yet that enables common citizens to participate in mosquito identification. This disclosure fills the gap by designing a computerized process, such as one enabled in a smart-phone based system, that enables anyone to take images of a still mosquito that is alive or dead (after possibly spraying or trapping), but still retaining its physical form, and then processes the images for species identification. This disclosure addresses the need for a system that is cheap, ubiquitous, and easily expandable to include more mosquito species beyond the current nine classified and discussed herein. The problem of identifying mosquito species from images is much harder than the certain others related to plants or larger animals, since there are no obvious (and un-aided) visually discernible markers across species types perceptible to the naked eye. In fact, public health workers with decades of experience still need a microscope and careful analysis to identify the species type of a mosquito specimen, hence demonstrating the complexity of the problem addressed here.

Based on the facts mentioned above and coupled with the increasing global spread of mosquito-borne diseases, public health experts are highly receptive to any technology-based solution for mosquito species identification and recording that is accurate, comfortable and fast, so that a) human resources in public health can be utilized more effectively, and b) citizens can be better informed and, hence, better served. To this extent, this disclosure addresses a need for a computer-based system that processes digital images, such as those gathered by a smart phone. The apparatuses, systems, and methods disclosed herein utilize commonly available processing hardware of computers, mobile computers, personal devices, and smart telephones and enable anyone to take images of a still mosquito that is alive or dead (after possibly spraying or trapping), but still retaining its physical form, and then processes the captured images for genus and species identification.

BRIEF SUMMARY OF THE DISCLOSURE

A computer implemented method of identifying an insect specimen with software storing instructions implementing computerized steps that include gathering a plurality of digital images of multiple insect specimens, wherein the digital images have a plurality of image orientations relative to a common axis; segmenting respective digital images into body pixels and image background pixels by detecting edges of the body pixels; extracting features of the insect specimens from the respective digital images by calculating variance of pixel intensity across the respective digital images; clustering the digital images according to the features; and classifying the insect specimens by species according to respective clusters.

BRIEF DESCRIPTION OF THE FIGURES

The patent application file or the patent issuing therefrom contains at least one drawing executed in color. Copies of this patent or patent application publication with the color drawing(s) will be provided by the Office upon request and payment of the necessary fee. Reference will now be made to the accompanying drawings, which are not necessarily drawn to scale.

FIG. 1 is a series of photographs (a) to (i) of nine species of mosquitos (three across three genus types) considered in one non-limiting example of this disclosure. FIG. 1(*a*) is a photograph of an insect specimen mosquito of the species *Aedes aegypti*. FIG. 1(*b*) is a photograph of an insect specimen mosquito of the species *Aedes* in fir matus. FIG. 1(*c*) is a photograph of an insect specimen mosquito of the species *Aedes taeniorhynchus*. FIG. 1(*d*) is a photograph of an insect specimen mosquito of the species *Anopheles crucians*. FIG. 1(*e*) is a photograph of an insect specimen mosquito of the species *Coquillettidia perturbans*. FIG. 1(*f*) is a photograph of an insect specimen mosquito of the species *Culex nigripalpus*. FIG. 1(*g*) is a photograph of an insect specimen mosquito of the species *Mansonia titillans*. FIG. 1(*h*) is a photograph of an insect specimen mosquito of the species *Psorophora columbiae*. FIG. 1(*i*) is a photograph of an insect specimen mosquito of the species *Psorophora ferax*.

FIG. 2 is a series of photographs (a) to (d) showing edge contrast in legs of different mosquito species. FIG. 2(*a*) is a photograph of an insect specimen mosquito of the species *Aedes aegypti*. FIG. 2(*b*) is a photograph of an insect specimen mosquito of the species *Aedes taeniorhynchus*. FIG. 2(*c*) is a photograph of an insect specimen mosquito of the species *Coquillettidia perturbans*. FIG. 2(*d*) is a photograph of an insect specimen mosquito of the species *Psorophora columbiae*.

FIG. 3 is a series of photographs (a) to (d) showing color contrast in wings of different mosquito species. FIG. 3(*a*) is a photograph of an insect specimen mosquito of the species *Aedes aegypti*. FIG. 3(*b*) is a photograph of an insect specimen mosquito of the species *Aedes taeniorhynchus*. FIG. 3(*c*) is a photograph of an insect specimen mosquito of the species *Coquillettidia perturbans*. FIG. 3(*d*) is a photograph of an insect specimen mosquito of the species *Psorophora columbiae*.

FIG. 4 is a schematic representation of selected results of background segmentation procedures set forth in this disclosure, beginning with an original image taken in a pink background, an additional image showing segmentation with significant contours, and a final image showing segmentation with integration of significant contours and a Gaussian mixture model.

DETAILED DESCRIPTION

Figure 5:
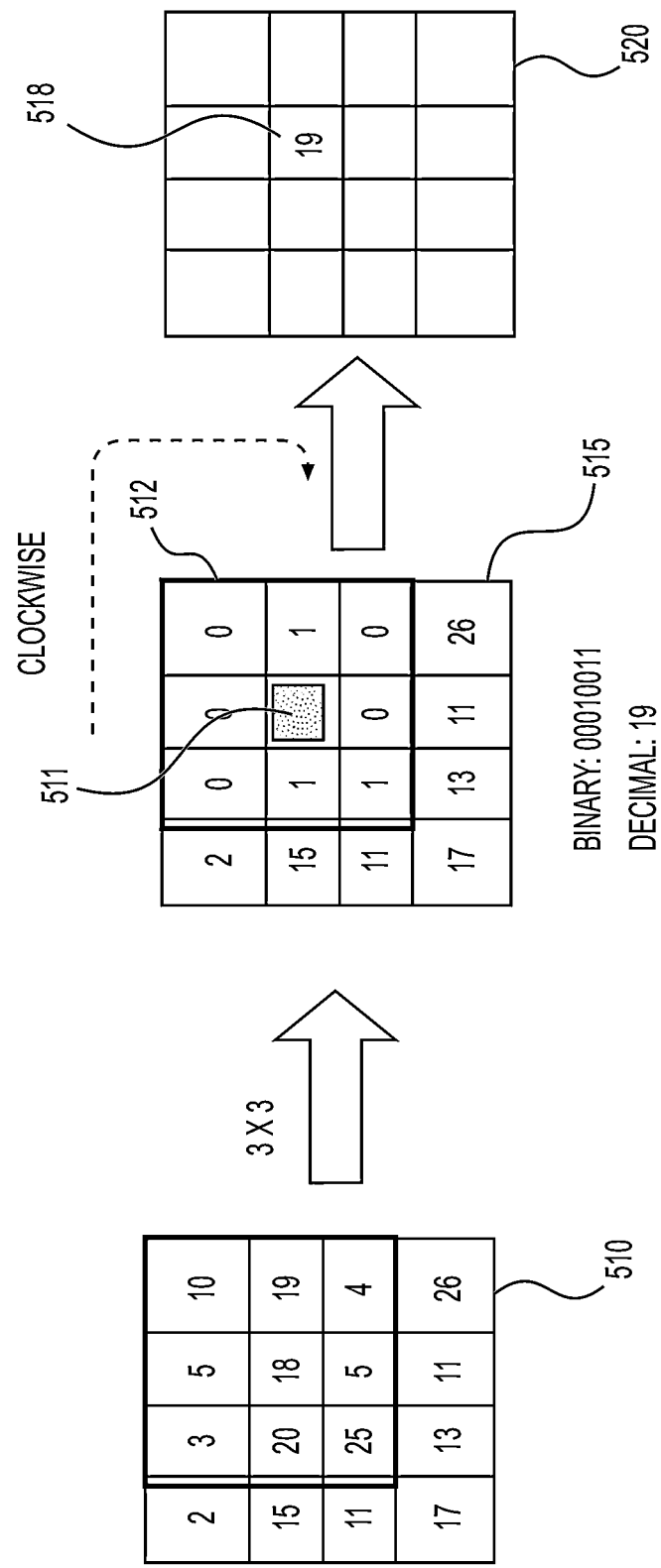
FIG. 5 is a schematic representation of a local binary pattern calculation for a single pixel of image data as disclosed herein.

In some aspects, the present disclosure relates to computerized apparatuses, computer implemented methods, and computerized systems that use digital image analysis to identify species of insect specimens, such as, but not limited to mosquitos. The disclosure presents a system wherein a user (expert or an ordinary citizen) takes a photo of a mosquito using a smart-phone, and then the image is immediately sent to a central server along with GPS of the smart-phone. The server will implement algorithms described in this disclosure to a) identify the genus of the mosquito; b) identify the species of the mosquito; c) separate the body parts of the image into objects of interest like wings, legs, proboscis, abdomen, scutum etc.; d) give feedback on species and genus back to user, along with info as to what diseases the species carry, and more interesting information like flight range etc. Potential uses are in mosquito identification, since it is a painful/cognitively demanding problem now. School districts could also use this app to teach kids about biology and other areas of science, given that these kids of scientific analysis skill may eventually be mandatory for schools in many areas). Defense and Homeland Security agencies and other government agencies may see a need for the computerized application described herein.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways. For example, the test results and examples all pertain to identification of genus and species of mosquitos from the mosquito traits and features extracted from digital images. The techniques and concepts utilized and claimed in this disclosure, however, are not limited to mosquitos, but can be used with other kinds of identification processes for other animals, humans, plants and the like.

It must also be noted that, as used in the specification and the appended claims, the singular forms "a," "an" and "the" include plural referents unless the context clearly dictates otherwise. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Ranges may be expressed herein as from "about" or "approximately" one particular value to "about" or "approximately" another particular value. When such a range is expressed, exemplary embodiments include from the one particular value to the other particular value. As used herein, "about" or "approximately" generally can mean within 20 percent, preferably within 10 percent, and more preferably within 5 percent of a given value or range, and can also include the exact value or range. Numerical quantities given herein can be approximate, meaning the term "about" or "approximately" can be inferred if not expressly stated.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

In prior work related to the embodiments of this disclosure, as disclosed in below noted reference [22], the utilized techniques leverage smart-phone images to identify a total of seven mosquito species. However, the technique in reference [22] had limitations stemming from poorer accuracy, inability to handle images taken in different backgrounds, and is also computationally very expensive to process on a smartphone (due to the processing of many features). In one non-limiting, improved system proposed in the embodiments of this disclosure, the number of genera identified is six and the number of species identified is nine, but the systems and methods described herein can directly be applied for more genus and species types across the globe. An improved system includes background segmentation that compensates for images taken in differing backgrounds; and is computationally much more efficient to enable processing on a smart-phone.

TABLE 1

Relevant Details on Dataset of Mosquito Species

| Species | No. of Specimens | No. of Image Samples (3 per Specimen) | Disease Spread | Geographical Location |
|---|---|---|---|---|
| *Aedes aegypti* | 11 | 33 | Zika fever, Dengue, Chikungunya | South America, North America, Asia and Africa |
| *Aedes infirmatus* | 10 | 30 | Eastern Equine Encephalitis (EEE) | South America and North America, |
| *Aedes taeniorhynchus* | 8 | 24 | West Nile Virus | South America and North America, |
| *Anopheles Crucians* | 15 | 45 | Malaria | South America, North America, and Africa |
| *Coquillettidia perturbans* | 14 | 42 | West Nile Virus | South America and North America, |
| *Culex nigripalpus* | 10 | 30 | West Nile Virus | South America, North America, and Africa |
| *Mansonia titillans* | 11 | 33 | Venezuelan Equine Encephalitis (VEE) | South America, North America, and Africa |

TABLE 1-continued

Relevant Details on Dataset of Mosquito Species

| Species | No. of Specimens | No. of Image Samples (3 per Specimen) | Disease Spread | Geographical Location |
|---|---|---|---|---|
| Psorophora columbiae | 11 | 33 | Venezuelan Equine Encephalitis (VEE) | South America, North America, and Africa |
| Psorophora ferox | 11 | 33 | West Nile Virus | South America, North America, And Africa |

In one experiment set up, this disclosure explains that the Hillsborough County, Florida area where the methods disclosed herein collected specimens from, there is a dedicated mosquito control board for trapping, collecting, and manually identifying mosquito species. In this county alone, up to 40 species of mosquitoes across numerous genus types are prevalent, not all of them at the same time though. Every week, personnel lay traps for mosquitoes in selected areas, and dead specimens are collected the next day, brought to the lab, and each specimen is visually identified using a microscope, and population results of genus and species are logged. The early collection of specimens is important because, once dead, they decay fast, making visual identification harder if delayed. During a couple of months between Fall 2016 and Spring 2017, those involved in this disclosure participated in multiple such efforts and were given a total of 101 female mosquito specimens from a total of nine different mosquito species, which were the ones most prevalent that time of the year in that county. Each specimen was carefully identified for genus and species and labeled by experts in the board to get the ground truth data.

Table 1 presents details on one example data set. A Samsung Galaxy S5 phone was then used to capture an image of each specimen under the same indoor light conditions, with the camera located one foot above each specimen without flash. Three images of each specimen (100A-100I) were captured in a different phone orientation, on top of one of three backgrounds. In non-limiting examples, this disclosure illustrates using a relatively white background (125), a yellow background (not shown) and a pink background (485). In total, 303 images were captured. FIGS. 1 (*a*) to (*i*) present one representative smart-phone image of each of the nine species (100A-100I) which are classified in this paper, when captured in a relatively white background (125). Features of the smartphone camera used in one non-limiting embodiment, are presented in Table 2. Note that multiple smartphones, computers, cameras, and other equipment that detects and gathers digital information, along with multiple backgrounds, could also be used, and the technique described will not change. All kinds of digital image equipment with corresponding hardware, used to gather specimen images, are within the scope of this disclosure.

a). Utility of Images Captured: Upon seeing the images generated, colleagues at the Mosquito Control Board indicated that they were sufficiently rich for a trained expert to visually identify the species from the images. This motivated researchers to achieve the same via learning techniques, that could be implemented on a smart-phone so that common citizens can do the same.

b). A Note on Gender of Specimens in our Dataset: Note here that all of the 101 mosquito specimens collected for one non-limiting example study were female. Among mosquitoes, only females engage in a blood meal (to provide nutrients for egg production), while males only feed on plant nectar. As such, only female species are disease vectors. In the traps that were laid for the experiments, carbon dioxide ($CO_2$) was used as a bait, which is typical. The presence of $CO_2$ tricks a female mosquito into believing that there is a blood meal present, and hence gets trapped [20]. Capturing male mosquitoes would have require separate traps with 'nectar' baits, which was beyond the scope of these non-limiting experimental setups. Nevertheless, it is generally true that external morphological characteristics of both males and females for any particular mosquito species are visually similar (with males consistently having a feather like proboscis [18]), and hence proposed techniques herein can be easily adapted to detect genus, species and genders, and is part of future efforts, with more experiments.

TABLE 2

Example Experimental Equipment - Samsung Galaxy S5 Camera Features

| Camera Details | Specifications |
|---|---|
| Sensor Resolution | 16 MP |
| Aperture size | F2.2 |
| Focal length | 31 mm |
| Shooting Mode | High Dynamic Range mode |
| Camera Light Source | Daylight |
| Background | White, Yellow & Pink |

This section presents a technical approach to classify mosquito species from smart-phone images. The term "smart-phone images" is not limiting of the disclosure, as noted above, because all kinds of digital imagery equipment is within the scope of this disclosure. There is a sequence of steps in the approach—image resizing, noise removal, background segmentation, feature extraction, dimensionality reduction, unsupervised clustering and classification. The techniques are the same irrespective of phones used or light conditions or backgrounds etc.

In one non-limiting case, a single smart-phone image contains 2988×5322 pixels. This is large, and will be computationally prohibitive for the phone during image processing and features extraction, and even more so when there are multiple images. For practicality, in non-limiting embodiments described herein, this disclosure shows resizing each image captured to a size of 256×256 pixels. This reduced the image size from around 3 MB to 16 KB, making processing much more practical and fast during model development and also run-time execution, without compromising accuracy.

This disclosure also includes implementing a median filter to reduce noise. Median filter [17] is a nonlinear technique, where each pixel value in a window of size n×n pixels is replaced by the median of all pixel values in that window. In one non-limiting embodiment case, the chosen example is n=3. In other filtering techniques like mean filter, pixels are replaced by mean values in a window, and in some cases, the mean value computed is not one that is actually there in the image, resulting in poorer retention of image fidelity, which also compromises edge and color preservation. Median filters avoid this problem, since median values of pixels are computed and retained during noise removal. For insect specimen identification, edge and color preservation are crucial since textural patterns of a mosquito that make up the edges (e.g., legs and wings), and their colors, aid in classification. For example, from FIG. 2, the photographs show that the legs 210A of *Aedes aegypti* and 210D *Psorophora* columbiae have a combination of black and white color patterns; and the legs 210B of *Aedes taeniorhynchus* and 210C of *Coquillettidia perturbans* have yellowish and black patterns. But the white and black patches 225D in the case of *Psorophora columbiae* are thinner than the patches (225A) of *Aedes aegypti*. Similar techniques can be used to differentiate the color formations (225B, 225C) of the other species. Similarly, from observation of FIG. 3 focusing on species wings (300A, 300B, 300C, 300D), one can see that the wings (300A) of *Aedes aegypti* are slightly whiter compared to others; the wings (300D) of *Psorophora columbiae* are slightly blacker than others; and those of *Aedes taeniorhynchus* and *Coquillettidia perturbans* (300B, 300C) are more brown. There are distinct color/textural patterns even in the scales (325) and shapes of contours (318A, 318B, 318C, 318D) of the wings of various species, hence demonstrating the importance of edge and color preservation, and the importance for median filters to remove noise.

The next step is background segmentation. Researchers anticipate mosquito images to be captured in a variety of backgrounds, so compensating for differing backgrounds is vital. The technical challenge here is automatically segmenting out all of the background information, while retaining only the region of interest (i.e., the mosquito). In one non-limiting technique, this disclosure employs a 2-step process. The first step is to detect the edges (425-431) of the mosquito in the image to find contours (318A, 318B, 318C, 318D). FIGS. 2 and 3 are best viewed in color that actually encompass a significant part of the image [6]. Following which, the process identifies image portions (460) within the image that need to be categorized as background by comparing images before and after contour detection. To do so, the example embodiments implemented Sobel edge detection algorithm for the segmenting problem, where the algorithm takes the derivative of each pixel intensity (retrieved after converting image to gray scale) with respect to its neighboring pixel [29]. The derivative of the image is discrete as it consists of a 2D array and it is necessary to take it in two directions: x-axis and y-axis. For example, the derivative of any arbitrary pixel in the x-axis will be calculated by taking the difference of pixel intensities between its left and right neighbor. The same applies to compute the derivative in y-axis. Whenever there is edge, there is a prominent change in pixel intensity. This will cause significant change in derivative value. This significant change denotes the presence of an edge (425-431). In order to identify contours (318A-318D), the system needs to know edge intensity and its direction. Direction of the edge, $\theta$, is calculated as $\theta=\tan-1\ g_x/g_y$, where $g_x$ and $g_y$ are the derivatives of each pixel intensity in x and y axis while edge intensity is calculated as, Edge_Intensity=$\sqrt{g^2_x+g^2_y}$. After retrieving direction and intensity, interim results show many contours enclosed within the edges. The significant contours encompass the largest number of (x,y) coordinates. Then the system compares the locations of each pixel of the significant contours with the locations of pixels in the original image. The pixel intensity at locations defining background pixels which are not in the significant contour are considered as background sections (471). While this may look like it solves a segmenting problem, there is one issue. For those portions of the background that are enclosed within identified edges (e.g., interior background pixels (456, 457, 458) within mosquito legs)), those are not segmented out, and are considered a part of the mosquito still. Such problems do not exist in regular image processing applications like face detection. However, correcting this issue is accomplished in the next step. Now that certain portions (471) of the background (485) are extracted, the next step is to create a probabilistic model which assumes that the background pixels (485) are generated from a Gaussian mixture [3] [30] [31]. In this step, the embodiments create different Gaussian mixtures for known background pixels (RGB color space background pixels retrieved from the first step). For accurately segmenting the background from the mosquito image, this disclosure introduces a threshold called T. In the set-up, if the probability that the intensity of any pixel belongs to the Gaussian mixture is higher than T, that pixel is considered as background and is segmented out. In case of images with many background portions, only a few of them will be considered as background if T is set too low, while if it is too high, then it will treat portions of the foreground image as background. The example embodiments initialize T with a random number between 0 to 1, and with repeated trial and error, identifies that setting T=0.65 gives the best results.

In the identification methods herein, researchers expect a relatively uniform background, since the smart-phone needs to be close to the mosquito during imaging, and overall focus area is less. As such, these parameter settings are general across backgrounds. Note that, since the distribution of pixels in the background is known a priori, shadows, and other portions of the background enclosed within edges are also removed in this technique. The effectiveness of our proposed 2-step approach in segmenting the background from an *Aedes aegypti* mosquito image taken in a pink background from our dataset is shown in FIG. 4.

The next step in the system is feature extraction. Unfortunately, in one non-limiting implementation, the standard RGB color space did not give good results since the perceptible color differences across species is minimal there. The steps were then executed with the Lab color space [27], that also considers lightness as a factor for determining color, and provides superior color perception [2]. This color space has three dimensions where, L represents lightness, and a and b represent the color opponents ranging from green-red and blue-yellow.

In order to extract features after transforming images to Lab color space, the experiments focused on textures. Recall from FIGS. 2 and 3 the importance of textures (patterns of scales 325 and colors in legs 225 and wings) in aiding species identification. Furthermore, textural patterns do not change much as the mosquito grows, and interacts with nature in the wild. Essentially, in texture analysis, one derives the dependency of intensity or variance across pixels in the image. This can be done in two ways. One is structural that captures dependencies among neighboring pixels, that enables superior perception of textures as primitives (spots, edges, curves and edge ends). The other is statistical, that computes local features by analyzing the spatial distribution of gray values of an image [16].

Local Binary Pattern [12] procedures, as shown at 510 in FIG. 5, are popular approaches that extract a combination of structural and statistical properties of an image. In this technique, textures are extracted on the basis of local patterns formed by each pixel. To do so, each pixel is labeled by thresholding the 3×3 neighborhood (512) of each pixel with the center pixel value (511). In other words, for each pixel of an image, the steps herein compare the pixel value of their 8 neighbors either clockwise (shown in FIG. 5) or counter-clockwise, a different option. As shown in FIG. 5 at 515, if the neighbor pixel value is greater than center's pixel value, the procedure replaces it with 1, otherwise with 0. This will give 8 binary digits, which are converted to decimal values 518, which will replace the value in the center pixel 511. The process repeats for all pixels in the image. The range of decimal values lies from 0 to 255. In FIG. 5, this disclosure shows a representative instance of determining Local Binary Patterns.

The experimental analysis also comprises deriving a histogram with 26 bins for the number of decimal values in each pixel in the range of 0 to 9; 10 to 19 and so on, up to 250 to 255. The number of values in each of the 26 bins is a feature. Essentially, when the number of bins with non-zero entries is less, it indicates fewer textural patterns, and when it is more, it is an indicator of more textural patterns.

While Local Binary Patterns do yield structural and statistical information on local textures, they cannot capture spatial dependencies among textures, which contrast mosquito species (e.g., alternating black and white patches in legs, variations in thickness of patches etc.). To capture these on a global scale, the system derives Haralick textural features, which employ higher order statistics to capture neighborhood properties of textures.

The basis of Haralick features [15] is a gray-level co-occurrence matrix, where gray-level indicates the intensity of a pixel in two dimensions. At the start, a square matrix of dimensions $G=N_g \times N_g$ is constructed, where $N_g$ denotes the number of gray levels in an image. An Element [i,j] in the matrix is generated by counting the number of times a pixel with value i is adjacent to a pixel with value j, and then dividing the entire matrix by the total number of such comparisons made. Each entry in the matrix is thus the probability that a pixel with value i will be found adjacent to a pixel of value j. Subsequently, using the pixel intensity dependencies identified in Matrix G, the system computes 13 Haralick features to capture spatial dependencies across textural patterns in the image. Table 3 presents these features, and how to compute them from the Matrix G below, where p(i, j) is defined as the probability that a pixel with value i will be found adjacent to a pixel of value j.

$$G = \begin{bmatrix} p(1,1) & p(1,2) & p(1,3) & \ldots & p(1,N_g) \\ p(2,1) & p(2,2) & p(2,3) & \ldots & p(2,N_g) \\ \vdots & \vdots & \vdots & \ddots & \vdots \\ p(N_g,1) & p(N_g,2) & p(N_g,3) & \ldots & p(N_g,N_g) \end{bmatrix}$$

Recall now that the results above have extracted 39 features from each mosquito image: 26 LBP and 13 Haralick Features. To make the solution computationally efficient, one non-limiting procedure employed Linear Discriminant analysis [21] for dimensionality reduction, where the aim is to find a linear combination of the 39 features by projecting them into a lower dimensional sub-space to avoid computational cost and over fitting, while the identified subspace maintains class variability and reduced correlation among features. To do so, let us assume, that there are K classes and each having mean $\mu_i$, and covariance $\Sigma$, where i=1, 2, 3, ... K. Then, the scatter between class variability is defined using sample covariance of the class means as:

$$\sum_b = \frac{1}{K}\sum_{i=1}^{K}(\mu_i - \mu)(\mu_i - \mu)^T, \tag{1}$$

where μ is the mean of the all class means. The separation of class in a direction $\vec{w}$, which is an eigenvector of $$\sum{}^{-1}\sum_b,$$

is computed as, $$S = \frac{\vec{w}^T \sum_b \vec{w}}{\vec{w}^T \sum \vec{w}}. \tag{2}$$

If $$\sum{}^{-1}\sum_b$$

is diagonalizable, the variability between features will be contained in the subspace spanned by the eigenvectors corresponding to the K−1 largest eigenvalues (since $$\sum_b$$

is of rank K−1 at most). These K−1 values will be the features for classification. In certain cases, since the non-limiting experiments have nine classes of mosquito species, eight final features are returned after LDA, that will be used for model development.

Figure 6:
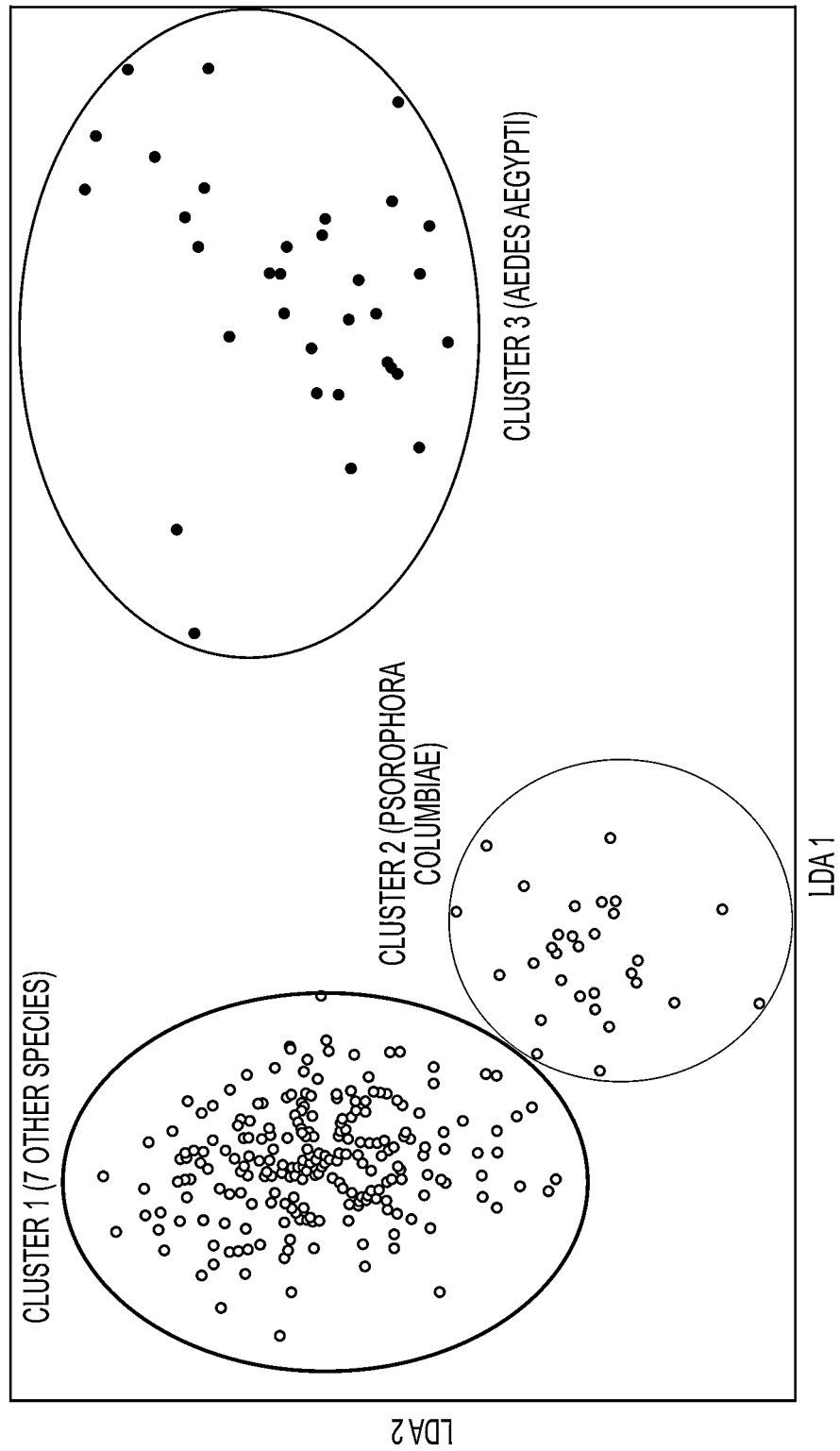
FIG. 6 is a schematic representation of three clusters of species identified after expectation maximization (EM) clustering as disclosed herein.

The first attempt to classify mosquito species is to investigate the efficacy of the eight features extracted as above, by checking to see if an unsupervised learning algorithm can by itself cluster image samples. To do so, work in this disclosure included designing as Expectation-Maximization (EM) algorithm [7] for clustering unlabeled mosquito images, where the idea is to estimate the Maximum Likelihood (ML) parameters from the observed samples. Assuming that each image is sampled from a mixture of Gaussian distributions, the EM algorithm attempts to find the model parameters of each Gaussian distribution from which the sample most likely is observed, while increasing the likelihood of the parameters in each iteration. It comprises of two steps in FIG. 6: Three Clusters Identified after EM Clustering each iteration. In the expectation, or E-step, model parameters are estimated based on observed samples. This is achieved using the conditional expectation. In the M-step, the likelihood function of model parameters is maximized under assumption that the observed sample is sampled from the estimated parameter. The iteration goes until convergence. Convergence is guaranteed since the algorithm is bound to increase the likelihood function at each iteration. With this clustering technique, the system illustrated very good performance when the number of clusters selected were 3, and with top 2 LDA features having highest variance. FIG. 6 presents results, where all samples belonging to *Aedes aegypti* and *Psorophora columbiae* were each clustered separately using just 2 features. This is a very interesting result from unsupervised clustering that justifies our selection of features as representative. However, all samples in 7 other species were clustered separately. These species are identified in Table 4.

With two of the three species already identified via clustering, the experiment described herein presents the final step of classifying the remaining 7 species. To do so, researchers use Support Vector Machines [9], which is an established supervised classification and regression machine learning algorithm, and requires minimal overhead to train and test. It gives fast and high performance with very little tuning of parameters. The main aim in SVM is to maximize the margin between classes to be identified by determining training instances that are called as support vectors which are used to define class boundaries. The middle of the margin is the optimal separating hyperplane between two classes. While testing, users of the computerized system and method described herein calculate the probability of each sample belonging to particular species and output the one that has highest probability.

Recall that, in one non-limiting embodiment, the apparatus, system and method of this disclosure are taking three smart-phone images of each mosquito specimen in different orientations. As such, three images will be given for classification in each instance. Since the number of species to be identified is only seven (after Clustering), for features from these samples alone, the steps include reapplying LDA to identify six features for classification. When implementing the SVM algorithm for this set (of 3 images each per specimen to be identified), the procedures compute the average probabilities of each species as identified from the SVM algorithm for each of the 3 images, and output the one with the highest average probability among all species classified.

TABLE 3

Formulas for Haralick's 13 features

| Features | Formula |
| --- | --- |
| Angular Second Moment | $\Sigma i\ \Sigma j\ p(i, j)^2$, where p(i, j) is defined as the probability that a pixel with value i will be found adjacent to a pixel of value j |
| Contrast | $\Sigma_{n=0}^{Ng-1}\ n^2\ \{\Sigma_{i=1}^{Ng}\ \Sigma_{j=1}^{Ng}\ p(i, j)\},\ |i - j| = n$ |
| Correlation | $(\Sigma i\ \Sigma j\ (i, j)p(i, j) - u_x u_y) \div \sigma_x\ \sigma_y$, where x and y are the row and column of an entry in co-occurrence matrix G, and $u_x, u_y, \sigma_x, \sigma_y$ are the means and standard deviations of px, py which is partial probability density functions of pixel x and y respectively |
| Sum of Squares: Variance | $\Sigma i\ \Sigma j\ (i - \mu)^2\ p(i, j)$ |
| Inverse Difference Moment | $\Sigma i\ \Sigma j\ (1 \div (1 + (i - j)^2)) \times p(i, j)$ |
| Sum Average | $\Sigma_{i=2}^{2Ng}\ (p_{x+y}\ (i))$ where $p_{x+y}$ (i) is the probability of co-occurrence matrix coordinates summing to x + y |
| Sum Entropy | $\Sigma_{i=2}^{2Ng}\ p_{x+y}\ (i)\ \log\{p_{x+y}\ (i)\} = fs$ |
| Sum Variance | $\Sigma_{i=2}^{2Ng}\ (i - fs)^2\ p_{x+y}\ (i)$ |
| Entropy | $-\Sigma i\ \Sigma j\ p(i, j)\log(p(i, j))$ |
| Difference Variance | $\Sigma_{i=0}^{Ng-1}\ i^2\ p_{x-y}\ (i)$ |
| Difference Entropy | $\Sigma_{i=0}^{Ng-1}\ p_{x-y}(i)\log\{p_{x-y}(i)\}$ |
| Information Measure of Correlation 1 | (HXY − HXY1) ÷ max {HX, HY}, where HXY = $-\Sigma i\ \Sigma j\ p(i, j)$, HX, HY are the entropies of px, py, HXY1 = $-\Sigma i\ \Sigma j\ p(i, j)\ \log\{p_x(i)p_y(j)\}$ |
| Information Measure of Correlation 2 | $(1 - \exp[-2(HXY2 - HXY)])^{1/2}$, where HXY2 = $\Sigma i\ \Sigma j\ p_y(j)\ \log\{p_x(i)p_y(j)\}$ |

TABLE 4

Figure 7:
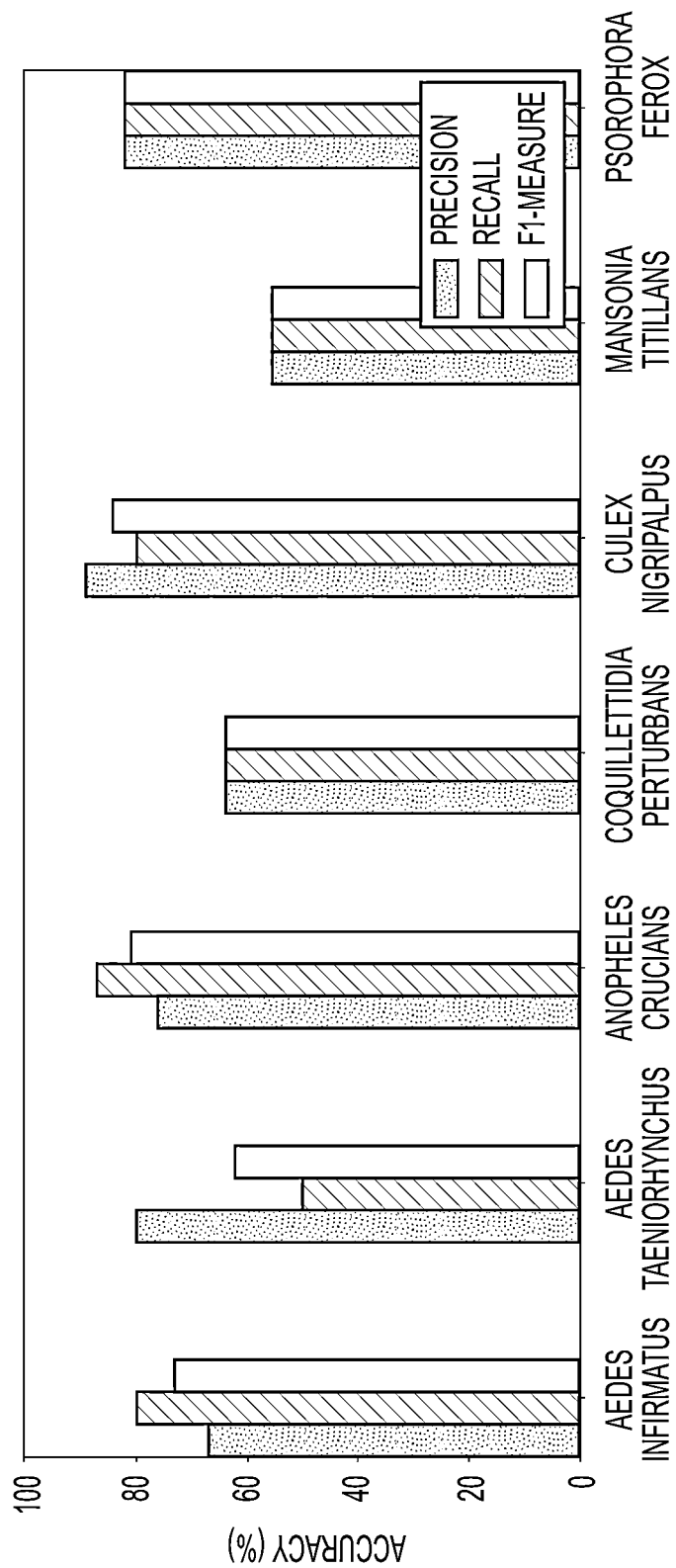
FIG. 7 is a schematic representation of data results showing comparative graphs of precision, recall, and F1-Measure for a 10-fold cross validation method for seven species.
Figure 8:
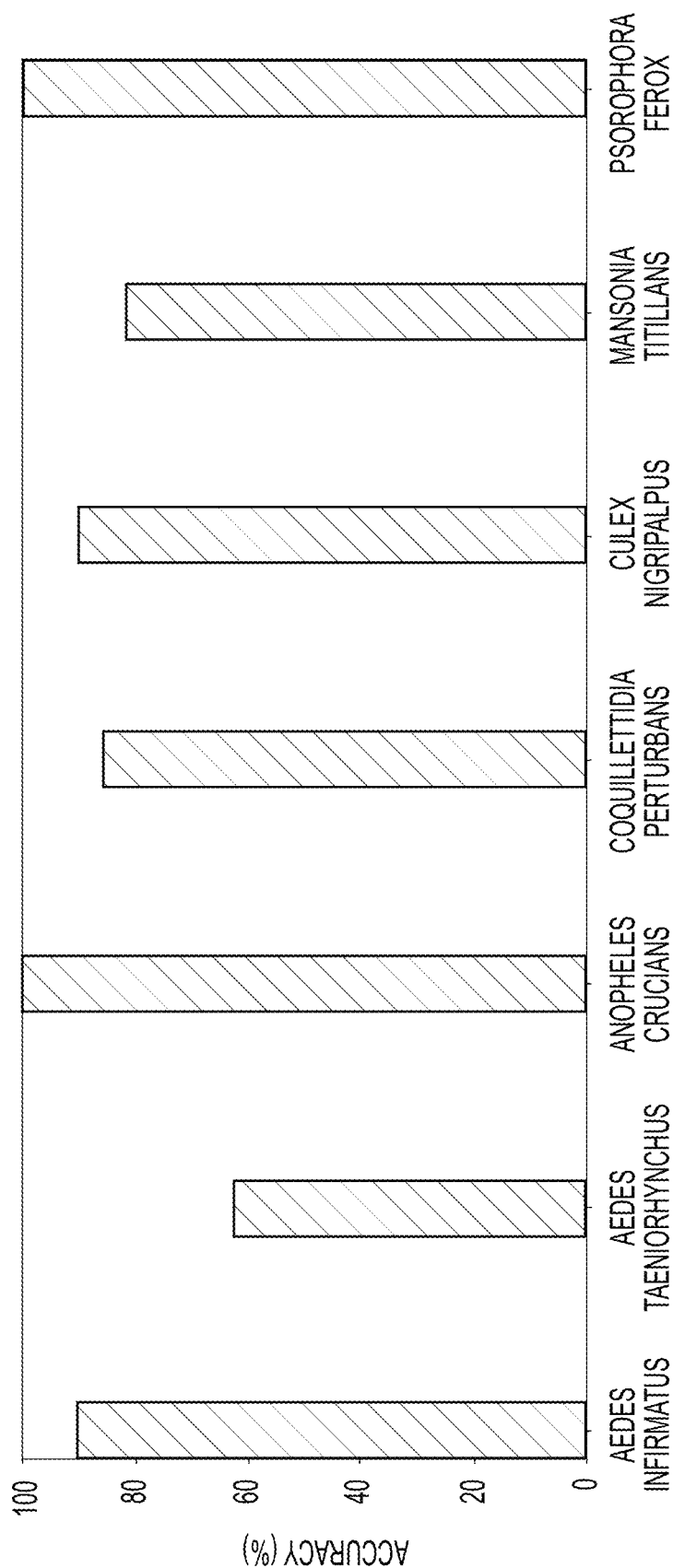
FIG. 8 is an accuracy graph of the top two results for a 10-fold cross validation method for seven species.

| Cluster Results | |
| --- | --- |
| Cluster | Species |
| 1 | Aedes infirmatus, Aedes taeniorhynchus, Anopheles crucians, Coquillettidia perturbans, Culex nigripalpus, Mansonia titillans, and Psorophora ferox |
| 2 | Psorophora columbiae |
| 3 | Aedes aegypti | a). Overview of Evaluation Methods: Recall that for two species, namely *Aedes aegypti* and *Psorophora columbiae*, the classification accuracy was 100% with Clustering alone. For the other seven species, the techniques described herein evaluate the ability of our SVM algorithm for classification under 10-fold cross validation technique, which is standard for our problem scope.

b). Results and Interpretations: FIG. 7 presents results in terms of Precision, Recall and F1-Measure for seven species, wherein for each specimen, the average classification probability for all 3 images of that specimen are computed, and the highest one is returned. The accuracy in this case for these seven species is 71.07%. Combined with 100% accuracy for two other species, the overall accuracy of the system for all nine species is 77.5%. In another non-limiting embodiment, the system attempts to output two species which have the top two highest classification probabilities from SVM, instead of only the top most (as shown above in FIG. 7). In other words, one way to evaluate accuracy of the system is if the actual species is among the top two species outputted from the algorithm. FIG. 8 presents results, and the accuracy naturally improves to 87.15% for the 7 species, resulting in an overall accuracy for nine species as 90.03%.

Interestingly, by aiming to identify each image of each specimen separately (without considering them as part of a set), the accuracy is only 47.16%. This result reveals the importance of capturing images in multiple orientations for enhanced accuracy to identify mosquito species. This procedure is quite practical for implementation as a computerized application, where citizens engage in the imaging/species identification process. In fact, for visual identification under a microscope, usually one orientation is not sufficient, and multiple orientations are needed for species identification even for experts.

c). Complexity of Execution: In one non-limiting embodiment, training the expectation—maximization ("EM") clustering and support vector machine (SVM) classification model has been implemented on a machine with Intel Core i7 CPU @2.6 GHz with 16 GB RAM configuration. Training the model took less than a few minutes in this example implementation, provided here for experimental disclosure. The entire process of classification (image preprocessing, feature extraction, LDA, Clustering and Classification algorithm) has been implemented as an application on a Samsung Galaxy S5 Smart-phone. The average time it took to classify a species was less than 2 seconds, with negligible energy consumption. Total memory consumed by the application in the phone was 23 MB.

d). Difficulties in Designing Deep and Transfer Learning Techniques to Identify Mosquito Species: We understand that deep-learning is state-of-art in object recognition. However, for effective model development using deep learning, tens of thousands of images are needed, since deep learning enables automatic feature extraction from the dataset. Generating 303 images in this paper was itself a challenge. Generating tens of thousands of mosquito images requires much more resources. Data Augmentation in one approach to create larger datasets via flipping, blurring, zooming and rotating images [25]. But this was not effective for us, because these are regularization techniques that have applicability when images classes are more diverse. But since there is minimal diversity in the physical appearance (and hence images) among various species of mosquitoes, this approach will likely introduce more noise, resulting in poorer accuracies. Our attempt in generating a dataset of 2000 mosquito images from the original 303, using augmentation, followed by species classification yielded an accuracy of only 55%. Enhancing our dataset size using open source images (e.g., Google Images) are not possible because there were not enough images tagged with the name of species, and even then we cannot guarantee that they were correctly tagged.

Another more recent technique is Transfer Learning, where the idea is to extend an existing model already trained to identify certain classes, in order to identify newer classes. Unfortunately, even the most popular VGGNet model [28] trained to recognize 1000 classes of images using the ImageNet database [11] fetched us only 47% accuracy. Primarily, no class among the 1000 in ImageNet were even remotely representative of mosquitoes, hence explaining low accuracy in species classification using Transfer Learning.

The embodiments of this disclosure show a system that allows any citizen to take image(s) of a still mosquito that is either alive or dead (via spraying or trapping), but still retaining its physical form, and subsequently processes the image(s) to identify the species type in real time.

a). Practical Impact: At peak times, hundreds of requests come daily from people complaining of mosquitoes in their neighborhoods. Deciding where to divert resources for trap laying and spraying is a constant problem for public health workers. In fact, in Florida, during the Zika Virus scare in 2016, the lack of information about species type during calls from concerned citizens was a huge problem for public health workers we spoke to. With knowledge on species type and density, reported by citizens themselves using our system, urgent needs can be better prioritized. Furthermore, with a system like ours in place available at mosquito control facilities, the process of species identification and logging is much faster. Expertise of public health workers can hence be shifted from the cognitively demanding task of species identification via a microscope, to more useful tasks in combating mosquitoes spread.

b). Future Work: We are now generating images of more mosquito specimens (male and female) in the Hillsborough County. With more species and specimens, and using more smart-phones for imaging, we hope to demonstrate superior validity of our system. The process of data collection though is very laborious, requiring months of laying traps, and tagging/imaging specimens. We are now working with public health experts to design a user-friendly smart-phone app that citizens can use for imaging, classification and reporting of mosquitoes. After testing, we will release it for public use in the Hillsborough county, and evaluate it. Images collected and tagged in this manner will also be publicly shared. Expanding our results to beyond Florida, and possibly beyond the US is also on our agenda, but is very challenging—technically and logistically.

Figure 9:
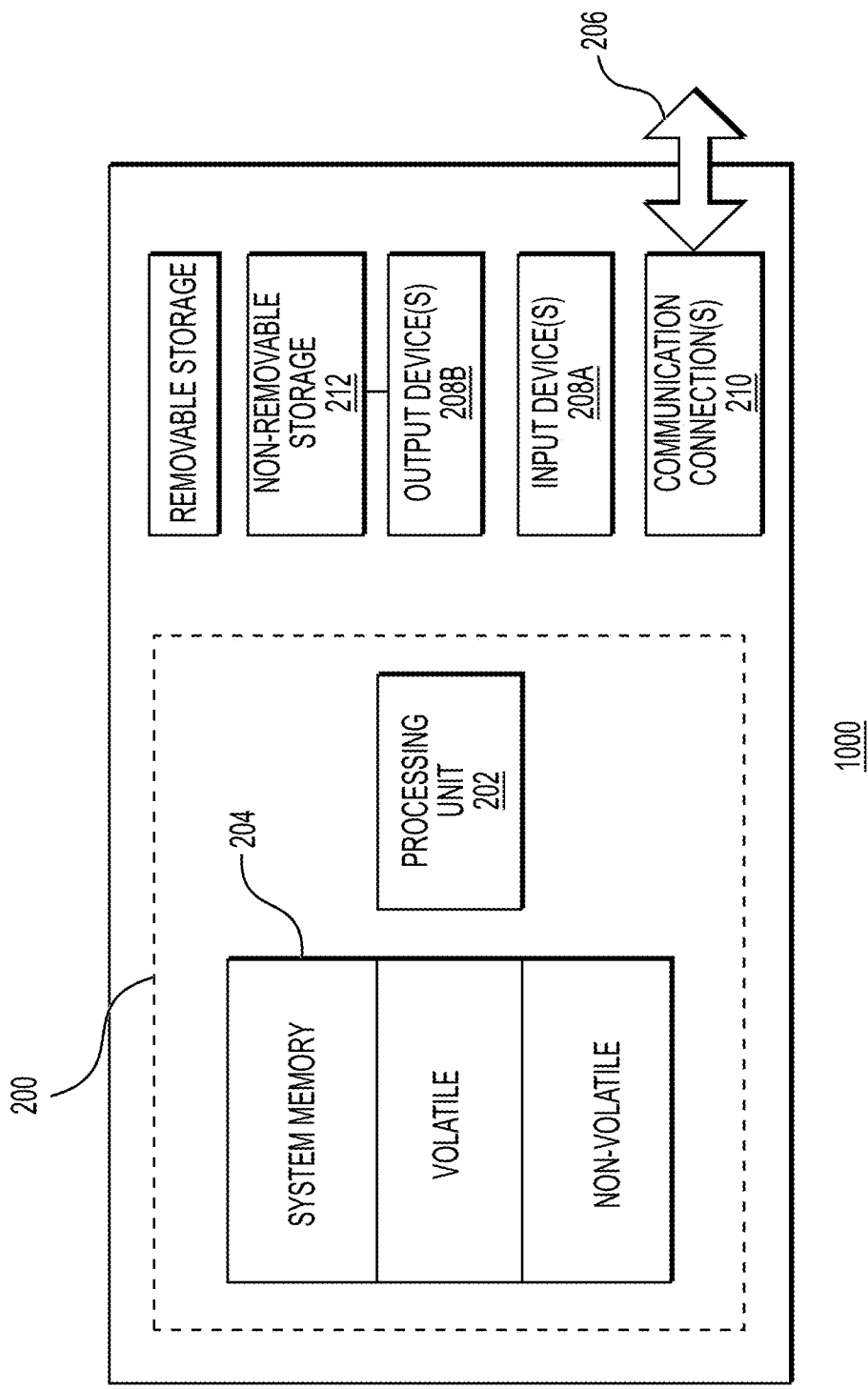
FIG. 9 is a schematic diagram of an example computer environment configured to implement the computerized methods of this disclosure.

As shown in FIG. 9, the systems and methods described herein may be implanted on commonly used computer hardware that is readily accessible by the general public. The computer 200 includes a processing unit 202 ("CPU"), a system memory 204, and a system bus 206 that couples the memory 204 to the CPU 202. The computer 200 further includes a mass storage device 212 for storing program modules. The program modules may be operable to perform associated with embodiments illustrated in one or more of FIGS. 1-8 discussed herein. The program modules may include an imaging application for causing a system to perform data acquisition, and/or for performing processing functions as described herein, for example to acquire and/or process image data corresponding to imaging of a region of interest (ROI). The computer 200 can include a data store for storing data that may include imaging-related data such as acquired data from the implementation in accordance with various embodiments of the present disclosure.

The mass storage device is connected to the CPU 202 through a mass storage controller (not shown) connected to the bus 206. The mass storage device and its associated computer-storage media provide non-volatile storage for the computer 200. Although the description of computer-storage media contained herein refers to a mass storage device, such as a hard disk or CD-ROM drive, it should be appreciated by those skilled in the art that computer-storage media can be any available computer storage media that can be accessed by the computer 200. "Computer storage media", "computer-readable storage medium" or "computer-readable storage media" as described herein do not include transitory signals.

According to various embodiments, the computer 200 may operate in a networked environment using connections to other local or remote computers through a network via a network interface unit 210 connected to the bus 206. The network interface unit 210 may facilitate connection of the computing device inputs and outputs to one or more suitable networks and/or connections such as a local area network (LAN), a wide area network (WAN), the Internet, a cellular network, a radio frequency (RF) network, a Bluetooth-enabled network, a Wi-Fi enabled network, a satellite-based network, or other wired and/or wireless networks for communication with external devices and/or systems. The computer 200 may also include an input/output controller 208A, 208B for receiving and processing input from any of a number of input devices. Input devices may include one or more of keyboards, mice, stylus, touchscreens, microphones, audio capturing devices, and image/video capturing devices. An end user may utilize the input devices to interact with a user interface, for example a graphical user interface, for managing various functions performed by the computer 200. The bus 206 may enable the processing unit 202 to read code and/or data to/from the mass storage device or other computer-storage media.

Using the computerized technology described above, non-limiting experimental models have been developed and based on 20,000+ images of 19 vector species in an example location, e.g., Tampa, Florida. With more data from other geographies, this disclosure can be used to expand the database of images and feature classification for species identification. For future classification, the proposed technique will isolate key features of a mosquito's morphology—wings, legs, abdomen, proboscis, and then use anatomically inspired deep learning techniques for species classification.

Additional details of the disclosure are set forth in the claims following citations to the following references used in this work.

REFERENCES

[1] 2018. CDC—Malaria—About Malaria—Biology—Mosquitoes—*Anopheles* Mosquitoes. https://www.cdc.gov/malaria/about/biology/mosquitoes/. (Accessed on Mar. 2, 2018).

[2] 2018. Explanation of the LAB Color Space. https://www.aces.edu/dept/fisheries/education/pond_to_plate/documents/ExplanationoftheLABColorSpace.pdf:. (Accessed on Feb. 24, 2018).

[3] 2018. Image Derivative • Chris McCormick. http://mccormickml.com/2013/02/26/image-derivative/. (Accessed on Mar. 1, 2018).

[4] 2018. Project Premonition—Microsoft Research. https://www.microsoft.com/en-us/research/project/project-premonition/. (Accessed on Feb. 23, 2018).

[5] Ahmedelmubarak Bashir, Zeinab A Mustafa, Islah Abdelhameid, and Rimaz Ibrahem. 2017. Detection of malaria parasites using digital image processing. In Communication, Control, Computing and Electronics Engineering (ICCCCEE), 2017 International Conference on. IEEE, 1-5.

[6] D Baswaraj, A Govardhan, and P Premchand. 2012. Active contours and image segmentation: The current state of the art. Global Journal of Computer Science and Technology (2012).

[7] Sean Borman. 2004. The expectation maximization algorithm—a short tutorial. Submitted for publication (2004), 1-9.

[8] Yanping Chen, Adena Why, Gustavo Batista, Agenor Mafra-Neto, and Eamonn Keogh. 2014. Flying insect detection and classification with inexpensive sensors. Journal of visualized experiments: JoVE 92 (2014).

[9] Corinna Cortes and Vladimir Vapnik. 1995. Support-vector networks. Machine learning 20, 3 (1995), 273-297.

[10] Anna MonicaMDe Los Reyes, Anna Camille A Reyes, Jumelyn L Torres, Dionis A Padilla, and Jocelyn Villaverde. 2016. Detection of *Aedes Aegypti* mosquito by digital image processing techniques and support vector machine. In Region 10 Conference (TENCON), 2016 IEEE. IEEE, 2342-2345.

[11] Jia Deng, Wei Dong, Richard Socher, Li-Jia Li, Kai Li, and Li Fei-Fei. 2009. Imagenet: A large-scale hierarchical image database. In Computer Vision and Pattern Recognition, 2009. CVPR 2009. IEEE Conference on. IEEE, 248-255.

[12] Anita Dixit and Nagaratna P Hegde. 2013. Image texture analysis-survey. In Advanced Computing and Communication Technologies (ACCT), 2013 Third International Conference on. IEEE, 69-76.

[13] Colin Favret and Jeffrey M Sieracki. 2016. Machine vision automated species identification scaled towards production levels. Systematic Entomology 41, 1 (2016), 133-143.

[14] Masataka Fuchida, Thejus Pathmakumar, Rajesh Elara Mohan, Ning Tan, and Akio Nakamura. 2017. Vision-based perception and classification of mosquitoes using support vector machine. Applied Sciences 7, 1 (2017), 51.

[15] Robert M Haralick, Karthikeyan Shanmugam, et al. 1973. Textural features for image classification. IEEE Transactions on systems, man, and cybernetics 6 (1973), 610-621.

[16] P S Hiremath and Rohini A Bhusnurmath. 2013. Texture Image Classification Using Nonsubsampled Contourlet Transform and Local Directional Binary Patterns. International Journal 3, 7 (2013).

[17] T Huang, GJTGY Yang, and G Tang. 1979. A fast two-dimensional median filtering algorithm. IEEE Transactions on Acoustics, Speech, and Signal Processing 27, 1 (1979), 13-18.

[18] PG Jupp. 1996. Mosquitoes of Southern Africa: Culicinae and Toxorhynchitinae. Hartebeespoort.

[19] Maxime Martineau, Donatello Conte, Romain Raveaux, Ingrid Arnault, Damien Munier, and Gilles Venturini. 2017. A survey on image-based insect classification. Pattern Recognition 65 (2017), 273-284.

[20] Conor J McMeniman, Román A Corfas, Benjamin J Matthews, Scott A Ritchie, and Leslie B Vosshall. 2014. Multimodal integration of carbon dioxide and other sensory cues drives mosquito attraction to humans. Cell 156, 5 (2014), 1060-1071.

[21] Sebastian Mika, Gunnar Ratsch, Jason Weston, Bernhard Scholkopf, and Klaus-Robert Mullers. 1999. Fisher discriminant analysis with kernels. In Neural Networks for Signal Processing IX, 1999. Proceedings of the 1999 IEEE Signal Processing Society Workshop. IEEE, 41-48.

[22] Mona Minakshi, Pratool Bharti, and Sriram Chellappan. 2017. Identifying mosquito species using smartphone cameras. In Networks and Communications (EuCNC), 2017 European Conference on. IEEE, 1-6.

[23] Haripriya Mukundarajan, Felix J H Hol, Erica A Castillo, Cooper Newby, and Manu Prakash. 2016. Using Mobile Phones as Acoustic Sensors for the Surveillance of Spatio-temporal Mosquito Ecology. (2016).

[24] J. P. Munoz, R. Boger, S. Dexter, R. Low, and J. Li. 2018. Image Recognition of Disease-Carrying Insects: A System for Combating Infectious Diseases Using Image Classification Techniques and Citizen Science. (2018).

[25] Luis Perez and Jason Wang. 2017. The effectiveness of data augmentation in image classification using deep learning. arXiv preprint arXiv:1712.04621 (2017).

[26] Antonio Rodríguez García, Frederic Bartumeus, and Ricard Gavaldà Mestre. 2016. Machine learning assists the classification of reports by citizens on diseasecarrying mosquitoes. In SoGood 2016: Data Science for Social Good: Proceedings of the First Workshop on Data Science for Social Good co-located with European Conference on Machine Learning and Principles and Practice of Knowledge Dicovery in Databases (ECML-PKDD 2016): Riva del Garda, Italy, Sep. 19, 2016. CEURWS. org, 1-11.

[27] Michael W Schwarz, William B Cowan, and John C Beatty. 1987. An experimental comparison of RGB, YIQ, LAB, HSV, and opponent color models. ACM Transactions on Graphics (TOG) 6, 2 (1987), 123-158.

[28] Karen Simonyan and AndrewZisserman. 2014. Very deep convolutional networks for large-scale image recognition. arXiv preprint arXiv:1409.1556 (2014).

[29] Irwin Sobel. 2014. An Isotropic 3×3 Image Gradient Operator. (February 2014).

[30] Chris Stauffer andWEric L Grimson. 1999. Adaptive background mixture models for real-time tracking. In Computer Vision and Pattern Recognition, 1999. IEEE Computer Society Conference on., Vol. 2. IEEE, 246-252.

[31] Brandyn White and Mubarak Shah. 2007. Automatically tuning background subtraction parameters using particle swarm optimization. In Multimedia and Expo, 2007 IEEE International Conference on. IEEE, 1826-1829.

[32] André Barretto Bruno Wilke, Rafael de Oliveira Christe, Laura Cristina Multini, Paloma Oliveira Vidal, Ramon Wilk-da Silva, Gabriela Cristina de Carvalho, and Mauro Toledo Marrelli. 2016. Morphometric wing characters as a tool for mosquito identification. PloS one 11, 8 (2016), e0161643.

[33] Mona Minakshi, Pratool Bharti, Sriram Chellappan. 2018. Leveraging Smart-Phone Cameras and Image Processing Techniques to Classify Mosquito Species. MobiQuitous '18 Proceedings of the 15th EAI International Conference on Mobile and Ubiquitous Systems: Computing, Networking and Services, Pages 77-86, Nov. 5-7, 2018.

The invention claimed is:

1. A computer implemented method of identifying an insect specimen with software storing instructions implementing computerized steps, comprising:
    gathering a plurality of digital images for each of a plurality of insect specimens, wherein each respective plurality of digital images corresponding with an insect specimen is obtained at a plurality of image orientations relative to a common axis;
    segmenting each respective plurality of digital images into body pixels and image background pixels by detecting edges of the body pixels;
    extracting features of each insect specimen from the respective plurality of digital images by calculating variance of pixel intensity across the respective plurality of digital images;
    clustering the digital images according to the features;
    classifying the insect specimens by species according to respective clusters.

2. The computerized method of claim 1, further comprising resizing the digital images to a smaller number of pixels.

3. The computerized method of claim 1, further comprising implementing a median filter on the digital images to reduce noise, wherein each pixel in a window is replaced by a median value of all pixel values in the window.

4. The computerized method of claim 1, wherein the segmenting of the body pixels and the background pixels comprises detecting contours in the digital images at edges of the body pixels.

5. The computerized method of claim 4, wherein the segmenting further comprises converting the digital images to grey scale and segmenting the digital images with a Sobel edge detection algorithm operated in both x and y directions of a two dimensional array.

6. The computerized method of claim 5, wherein the segmenting further comprises detecting a respective direction of the edges and intensity of corresponding pixels of the edges.

7. The computerized method of claim 6, further comprising removing enclosed background pixels located within identified edges enclosing the body pixels of the digital images.

8. The computerized method of claim 7, wherein removing the enclosed background pixels comprises labeling respective pixels as background pixels according to a probability threshold that a given pixel is one of the background pixels.

9. The computerized method of claim 1, wherein extracted features are calculated after transforming the digital images to a selected color space.

10. The computerized method of claim 9, wherein the extracted features are textures of the insect specimen detected by at least one of a structural identification method using dependency of intensity values among neighboring pixels and a statistical identification method analyzing spatial distribution of gray values within the digital images.

11. The computerized method of claim 10, wherein extracting features comprises identifying local binary patterns in the digital image.

12. The computerized method of claim 10, wherein extracting features comprises deriving Haralick textural features from respective probabilities that corresponding pixels with selected gray levels are side by side in the digital images and calculating spatial dependencies within the digital images.

13. The computerized method of claim 10, wherein extracting features comprises reducing dimensionality of sets of extracted features by projecting the extracted features into a lower dimension sub-space and calculating a linear combination of the extracted features that maintains class variability and reduces correlation among the extracted features.

14. The computerized method of claim 13, further comprising extracting the features in a Lab color space, where L represents lightness, and a and b represent color opponents ranging from green-red and blue-yellow.

15. The computerized method of claim 1, wherein the clustering comprises sampling the body pixels of the digital images with a plurality of Gaussian distributions and identifying model parameters by which an unsupervised learning algorithm finds each Gaussian distribution from which respective samples originate.

16. The computerized method of claim 15, further comprising classifying clusters according to the model parameters and calculating a probability that the respective samples belong to a particular species.

17. A computer program product implemented on a personal communications device having a camera for acquiring digital images, the computer program product configured for storing in memory and executed by at least one processor on the personal communications device, causing the processor to implement steps of a computerized method comprising:
    gathering a plurality of digital images for each of a plurality of insect specimens positioned within a respective set of image backgrounds, wherein each respective plurality of digital images corresponding with an insect specimen is obtained at a plurality of image orientations relative to a common axis;
    extracting image portions from each digital image;
    converting the image portions into a selected color space data set; and
    using trained neural networks to classify the digital images with algorithms stored in software that cause the processor to:
    segment respective digital images into body pixels and image background pixels by detecting edges of the body pixels;
    extracting features of the insect specimens from the respective digital images by calculating variance of pixel intensity across the respective digital images;
    clustering the digital images according to the features; and
    classifying the insect specimens by species according to respective clusters.

18. The computer program product of claim 17, further comprising network communications software in data communication with the computer program product for implementing cloud based processing and identification.

19. The computer program product of claim 18, further comprising clustering with an unsupervised learning algorithm implemented by the neural network.

20. The computer program product of claim 19, further comprising classifying the insect specimens with at least one support vector machine.

\* \* \* \* \*